United States Patent Office 2,981,748
Patented Apr. 25, 1961

2,981,748

THIOPHOSPHORIC ACID ESTERS

Jean Metivier, Arpajon, France, assignor to Societe des Usines Chimiques Rhone-Poulenc, Paris, France, a French body corporate No Drawing. Filed July 16, 1959, Ser. No. 827,453

Claims priority, application France Aug. 5, 1958

5 Claims. (Cl. 260—461)

This invention relates to new phosphoric esters, their preparation and pesticidal compositions containing the same.

According to a first feature of the present invention there are provided esters of the general Formula I:

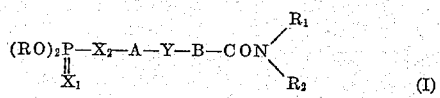

in which $X_1$ and $X_2$ are the same or different and each represent an oxygen atom or a sulphur atom, at least one of them being a sulphur atom, A represents an ethylene or isopropylene group, B represents a methylene or ethylidene group, Y represents the group SO or $SO_2$, R represents a lower alkyl group and $R_1$ and $R_2$ are the same or different and each represent a hydrogen atom, a lower alkyl group, a phenyl group or a cyclohexyl group, or $R_1$ and $R_2$ represent with the nitrogen atom attached thereto a saturated heterocycle such as piperidine, pyrrolidine or morpholine. By "lower alkyl group" is meant a group containing from 1 to 4 carbon atoms.

According to a further feature of the invention there is provided a method for the production of esters of general Formula I wherein $X_1$ and $X_2$ are both sulphur atoms and A is an ethylene group, which comprises reacting a dithiophosphoric acid of the general Formula II:

in which R has the meaning assigned to it above, when a compound of the general Formula III:

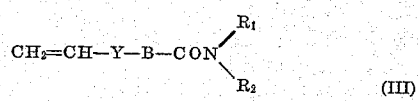

whereas Y, B, $R_1$ and $R_2$ have the meanings assigned to them above. Compounds of general Formula III may be obtained by dehydrohalogenation, by means of triethylamine, of the corresponding 5-halogeno-valeramide.

The reaction between compounds of Formulas II and III is preferably carried out in an organic solvent medium at moderate temperature, e.g. below 150° C. Most conveniently the solvent employed is an aliphatic alcohol (preferably methyl or ethyl alcohol), an aliphatic ketone (preferably acetone or methylethylketone) or an aromatic hydrocarbon (preferably benzene or toluene).

According to a further feature of the invention there is provided a process for the production of compounds of general Formula I which comprises oxidizing a compound of the general Formua IV:

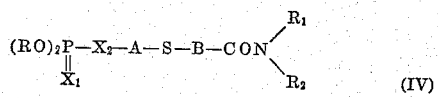

in which R, $X_1$, $X_2$, A, B, $R_1$ and $R_2$ have the meaning assigned to them above. Suitable oxidising agents, are for example, hydrogen peroxide, bromine and chlorine.

This reaction can be carried out with or without a solvent, but it is preferable to operate in water at a temperature lower than 150° C.

The new phosphoric esters of general Formula I have remarkable pesticidal properties, and more especially insecticidal and acaricidal properties.

The present invention accordingly further provides pesticidal compositions which comprises at least one phosphoric ester of general Formula I in association with one or more diluents compatible with the phosphoric ester or esters and suitable for pesticidal use. The compositions may be solid if a compatible pulverous solid diluent is employed, such as talc, calcined magnesia, kieselguhr, tricalcium phosphate, powdered cork, absorbent charcoal or a clay such as, for example, kaolin or bentonite, the quantity of phosphoric ester preferably being between 0.005% and 50% of the weight of the composition. Instead of a solid, there may be employed a liquid diluent in which the phosphoric ester is dissolved or dispersed, the content of phosphoric ester preferably being between 0.005% and 50% of the weight of the composition. The composition can thus be prepared in the form of an aerosol, a suspension, an emulsion or a solution in an organic or aqueous organic medium, for example an aromatic hydrocarbon, such as toluene or xylene, or a mineral, animal or vegetable oil, or a mixture of such liquid diluents. Compositions in the form of dispersions, solutions or emulsions may contain wetting, dispersing or emulsifying agents of the ionic or non-ionic type, for example sulphoricinoleates, quaternary ammonium derivatives or products based on ethylene condensates, such as products of condensation of ethylene oxide with octylphenol or fatty acid esters of anhydrosorbitols which have been solubilised by etherification of the free hydroxyl groups by condensation with ethylene oxide. It is preferable to use agents of the non-ionic type, because they are not sensitive to electrolytes. When emulsions are desired, the phosphoric ester may be used in the form of self-emulsifying concentrates containing the active substance in solution in the dispersing agent or in a solvent compatible with the said agent, and compositions ready for use can then be obtained by simply adding water.

Solid compositions are preferably prepared by crushing the phosphoric ester with the solid diluent, or by impregnation of the solid diluent with a solution of the phosphoric ester in a volatile solvent, evaporating the solvent and, if necessary, crushing the product to powder.

These new compounds can be employed in mixture with other pesticides, including substances producing a synergistic effect.

The following examples will serve to illustrate the invention:

*Example I*

To a solution of 19.6 g. of N-methyl-5-chloro-3-thia-3-dioxo-valeramide in 250 cc. of benzene heated at 40° C. are gradually added 11.1 g. of triethylamine, and this temperature is maintained for 1 hour on completion of the addition. 29 g. of O,O-diethyldithiophosphoric acid are added to the suspension obtained and the mixture is heated under reflux for 3 hours. The cold reaction mixture is mixed with 100 cc. of water and is washed with a sodium bicarbonate solution and then with distilled water. After drying over sodium sulphate and treatment with decolorising charcoal, the benzene solution is evaporated under reduced pressure. There then remains a residue weighing 16 g., which crystallises on cooling.

On crystallisation from ethyl alcohol, there are obtained 21.5 g. of N-methyl-5-(O,O-diethyldithiophosphoryl)-3-thia-3-dioxovaleramide, M.P. 55° C.

The N-methyl-5-chloro-3-thia-3-dioxovaleramide employed as starting material is obtained by oxidation of N-methyl-5-chloro-3-thia-valeramide by means of an excess of hydrogen peroxide in acetic acid medium. On crystallisation from ethyl alcohol, it melts at 115° C.

Example II 11.1 g. of triethylamine are added to a suspension of 19.7 g. of N-methyl-5-chloro-3-thia-3-oxo-2-methylvaleramide in 250 cc. of benzene maintained at a temperature of 40° C., and heating at this temperature is continued for one hour on completion of the addition.

29 g. of O,O-diethyldithiophosphoric acid are added to the obtained suspension and the mixture is heated under reflux for 4 hours. The cold reaction mixture is mixed with 100 cc. of water and the benzene layer is separated and washed by means of an 8% bicarbonate solution. After washing with water, drying over sodium sulphate and passing through decolorising charcoal, the benzene solution is evaporated under reduced pressure and thereafter under a substantial vacuum to constant weight. There finally remain 33.5 g. of a very slightly coloured oil, which is shown by analysis to be N-methyl-5-(O,O-diethyldithiophosphoryl) - 3 - thia - 3 - oxo - 2 - methylvaleramide.

The N - methyl - 5 - chloro - 3 - thia - 3 - oxo - 2-methylvaleramide employed as starting material is prepared by oxidation by hydrogen peroxide of N-methyl-5-chloro-3-thia-2-methylvaleramide. After crystallisation from ethyl acetate, it melts at 84–86° C.

Example III

To a suspension of 21 g. of 5-chloro-3-thia-3-oxo-valeramide in 250 cc. of benzene, heated at about 45° C., are gradually added 13.3 g. of triethylamine, whereafter the temperature is maintained for 3 hours. 34.5 g. of O,O-diethyldithiophosphoric acid are then added and the mixture is heated under reflux for 4 hours. After treatment as indicated in Example II, the residue is mixed with 100 cc. of cyclohexane. The oil insoluble in cyclohexane is separated by decantation and then concentrated under reduced pressure. There finally remain 10 g. of a clear oily liquid, analysis of which shows it to be 5-(O,O-diethyldithiophosphoryl)-3-thia-3-oxo-valeramide.

The 5-chloro-3-thia-3-oxo-valeramide employed as starting material is prepared by oxidation of 5-chloro-3-thiavaleramide with hydrogen peroxide in acetic acid medium. It melts at 158° C.

Example IV 12.6 g. of triethylamine are added to a suspension maintained at 40–45° C. of 19.5 g. of 5-chloro-3-thia-3-dioxo-valeramide in 200 cc. of benzene, and the temperature is maintained for 2 hours on completion of the addition. 29.7 g. of O,O-diethyldithiophosphoric acid are added to the reaction mixture, which is heated for 5 hours. After treatment as indicated in Example I, there are obtained 25 g. of a crystallised residue which, on recrystallisation from ethyl alcohol, gives 15 g. of 5-(O,O-diethyldithiophosphoryl)-3-thia-3-dioxo-valeramide, M.P. 72° C.

The 5-chloro-3-thia-3-dioxo-valeramide employed as starting material is prepared by oxidation of 5-chloro-3-thia-valeramide with an excess of hydrogen peroxide in acetic acid medium. It melts at 137° C.

Example V

To 20 g. of N-methyl-5-(O,O-diethyldithiophosphoryl)-3-thia-3-dioxo-valeramide are added 70 g. of xylene and 10 g. of a condensation product of ethylene oxide and octyl phenol containing 10 molecules of ethylene oxide per molecule of octyl phenol.

There is thus obtained a self-emulsifying concentrate which, when diluted with 100 parts by volume of water, gives an emulsion which can be used by spraying on apple trees as an effective and durable agent for combating plant lice and more especially red spiders.

Example VI

To 10 g. of N-methyl-5-(O,O-diethyldithiophosphoryl)-3-thia-3-oxo-2-methylvaleramide are added 40 cc. of xylene and 10 g. of sodium dioctyl sulphosuccinate.

The self-emulsifying solution thus obtained is diluted in 50 litres of water. By spraying this aqueous solution on to bean stems infected with red spiders, a complete and lasting destruction of the spiders is effected.

Example VII

To a solution of 10 g. of 5-(O,O-diethyldithiophosphoryl)-3-thia-3-oxovaleramide in 20 cc. of acetone is added 0.5 g. of a condensation product of ethylene oxide and octyl phenol as used in Example V.

10 g. of charcoal are incorporated in the solution obtained which is stirred to render it homogeneous and the solvent is evaporated. When this operation has been completed, the powder obtained is finely crushed.

Bean seeds are treated in the dry state with this powder in a proportion of 4 g. of powder to 100 g. of seeds. The beans are thereafter planted and when the stems have developed, they are contaminated with red spiders (*Tetranychus telarius*). Two days after the contamination, the spiders are dead.

I claim:

1. Phosphoric ester of the general formula:

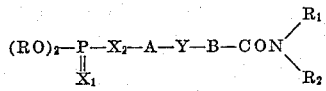

wherein $X_1$ and $X_2$ are each selected from the class consisting of oxygen and sulphur atoms at least one of them being a sulphur atom, A is selected from the class consisting of ethylene and isopropylene groups, B is selected from the class consisting of methylene and ethylidene groups, Y is selected from the class consisting of SO and $SO_2$ groups, R is a lower alkyl group and $R_1$ and $R_2$ are each selected from the class consisting of hydrogen and lower alkyl groups.

2. N - methyl - 5 - (O,O - diethyldithiophosphoryl)-3-thia-3-dioxo-valeramide.

3. N - methyl - 5 - (O,O - diethyldithiophosphoryl)-3-thia-3-oxo-2-methylvaleramide.

4. 5 - (O,O - diethyldithiophosphoryl) - 3 - thia - 3-oxo-valeramide.

5. 5 - (O,O - diethyldithiophosphoryl) - 3 - thia - 3-dioxo-valeramide.

References Cited in the file of this patent

UNITED STATES PATENTS 2,630,451   Fletcher et al. _____ Mar. 3, 1953

FOREIGN PATENTS 517,089   Canada _____ Oct. 4, 1955